United States Patent [19]

Ishikawa et al.

[11] Patent Number: 4,864,637

[45] Date of Patent: Sep. 5, 1989

[54] FMX STEREOPHONIC BROADCAST RECEIVER

[75] Inventors: Tsutomu Ishikawa; Noboru Usui; Kanji Tanaka, all of Ota; Ryuichi Ogawa, Gunma; Kazuhisa Ishiguro, Gunma; Masashi Arai, Gunma, all of Japan

[73] Assignee: Sanyo Electric Co, Ltd., Japan

[21] Appl. No.: 195,106

[22] Filed: May 16, 1988

[30] Foreign Application Priority Data

May 19, 1987 [JP] Japan .................. 62-122324
Jul. 17, 1987 [JP] Japan .................. 62-179300

[51] Int. Cl.⁴ .............................................. H04B 1/16
[52] U.S. Cl. .................................... 455/205; 455/214; 329/316; 370/11; 381/2
[58] Field of Search .............. 455/45, 42, 205, 214, 455/228, 337, 296, 303, 309, 312; 381/2, 4, 7, 10, 13; 370/11; 358/198; 329/112

[56] References Cited

U.S. PATENT DOCUMENTS

| 4,079,204 | 3/1978 | Takahashi et al. | 455/205 |
| 4,356,567 | 10/1982 | Eguchi et al. | 455/205 |
| 4,472,830 | 9/1984 | Nagai | 381/2 |
| 4,476,581 | 10/1984 | Bragas | 455/45 |
| 4,486,897 | 12/1984 | Nagai | 381/2 |
| 4,539,697 | 9/1985 | Ishida et al. | 455/214 |
| 4,660,193 | 4/1987 | Young et al. | 455/45 |

*Primary Examiner*—Robert L. Griffin
*Assistant Examiner*—Curtis Kuntz
*Attorney, Agent, or Firm*—Darby & Darby

[57] ABSTRACT

An improved FMX sterophonic broadcast receiver provided with countermeasures against transient noises, which includes a level detection circuit for detecting level of a detected stereo difference signal, and a level control circuit for controlling level of an expanded stereo difference signal according to an output signal of the level detection circuit. By the above arrangement of the present invention, since it is so arranged to cause the level control circuit to function when the degree of modulation becomes large so as to control the level of the stereo difference signal to be low, a level difference is produced between the stereo sum signal and the stereo difference signal for deterioration of the stereo separation degree upon matrixing at a matrix circuit for reduction of noises accordingly.

2 Claims, 6 Drawing Sheets

FMX STEREOPHONIC BROADCAST RECEIVER

BACKGROUND OF THE INVENTION

The present invention generally relates to a radio receiver for receiving an FMX stereophonic broadcasting and more particularly, to an FMX stereophonic broadcast receiver provided with countermeasures against transient noises.

FMX stereophonic broadcasting has been proposed as one means for expanding the service area and improving the signal-to-noise ratio characteristics of FM stereophonic broadcasts. The transmission signal of the aforementioned FMX stereophonic broadcast includes a compressed stereo difference signal $(L+R)'$ broadcast simultaneously with the transmission signal of conventional FM stereophonic broadcasting, for example, a stereo sum signal $(L+R)$ and stereo difference signal $(L-R)$. The transmission signal can be expressed as:

$$f(t) = (L+R) + P\sin(\omega/2)t + (L-R)\sin\omega t + (L-R)'\cos\omega t \qquad (1)$$

where $L+R$ is a stereo sum signal, $L-R$ is a stereo difference signal P, is a stereo pilot signal, and $\omega$ is the subcarrier angular frequency. As shown by the aforementioned Equation (1), compressed stereo difference signal $(L-R)'$ is quadrature modulated from uncompressed stereo difference signal $(L-R)$, resulting in an FMX stereophonic broadcast transmission signal spectrum shown in FIG. 4.

Furthermore, the relationship between the uncompressed stereo difference signal $(L-R)$ and the compressed stereo difference signal $(L-R)'$ is as shown in FIG. 5 which expresses the compression characteristics. In FIG. 5, when the input signal level is low, the aforementioned signal $(L-R)'$ is 20 dB greater than the uncompressed stereo difference signal $(L-R)$ and, at the same time, input/output characteristics become linear, and also the compression ratio becomes 1:1. When the level of the input signal is medium (approximately $-30$ dB), the compression ratio becomes $\infty:1$, and input/output characteristics are flat over a range of approximately 10 dB. When the input signal level becomes high, the aforementioned signal $(L-R)'$ rapidly attenuates. Therefore, compressed stereo difference signal $(L-R)'$ is as shown by solid line (b) in FIG. 5 with respect to stereo difference signal $(L-R)$ (solid line (a)), and the sum signal of the aforementioned signal $(L-R)$ and the aforementioned signal $(L-R)'$ is as shown by dotted line (c) in FIG. 5.

The transmission signal for FMX stereophonic broadcasting as described above is received by a conventional receiver as shown in FIG. 7. In FIG. 7, the FMX stereophonic broadcast transmission signal received by antenna 1 is received by a receiving circuit 2 of the same construction as a conventional FM stereophonic receiver in which stereo sum signal $(L+R)$ (hereinafter referred to as M), stereo difference signal $(L-R)$ (hereinafter referred to as S), and compressed stereo difference signal $(L-R)'$ (hereinafter referred to as S') are each demodulated. When the received signal is detected by the FM detection circuit (not shown) included in the receiving circuit 2, the stereo sum signal M is demodulated. When the stereo composite signal is subjected to synchronous detection through employment of the 38-KHz subcarrier signal obtained from a PLL in the receiving circuit 2, uncompressed stereo difference signal S is demodulated. And when the stereo composite signal is subjected to quadrature detection, the compressed stereo difference signal S' is demodulated.

The uncompressed and compressed stereo difference signals S and S' obtained from the receiving circuit 2 are added by an adder 3, and the result is supplied to a VCA (voltage control amplifier) 4 operating as an attenuator. When the stereo difference signal S and output signal $(S+S')$ of the VCA 4 are greater than a specified level (a knee-point level), first and second level detection circuits 5 and 6, each having a threshold level, operate in such a manner that the level of stereo difference signal S and the level of the aforementioned output signal $(S+S')$ of the VCA 4 are respectively detected by the first and second level detection circuits 5 and 6, and are compared by a comparison circuit 7. Next, a signal according to the level difference obtained from the aforementioned comparison circuit 7 is rectified and smoothed by a rectifying circuit 8, and the rectified signal is applied to the VCA 4 as a control signal. The output signal $(S+S')$ of the aforementioned VCA 4 is controlled by this control signal to be equal to the level of the stereo difference signal S. However, when the aforementioned stereo difference signal S and output signal $(S+S')$ of the VCA 4 are below the knee-point level, the first and second level detection circuits 5 and 6 do not operate, and attenuation at the VCA 4 is fixed at approximately 20 dB.

Although the stereo sum signal M obtained from the receiving circuit 2 is applied directly to a matrix circuit 9, and the stereo difference signal S and output signal $(S+S')$ of the VCA 4 are selected by a switch 10, and applied to the matrix circuit 9. A 10Hz ID signal is included in the FMX stereophonic broadcast transmission signal, and FMX stereophonic broadcasts are differentiated from conventional FM stereophonic broadcasts by the aforementioned ID signal. In addition, because an ID detection circuit (not shown) which detects the aforementioned ID signal is incorporated in the receiving circuit 2, whether the broadcast is FMX stereo or not can be determined by the output signal of the ID detection circuit. The switch 10 is controlled by the aforementioned ID signal. When the ID signal (such as a HIGH level signal) is present, the switch 10 is switched to a position as shown in FIG. 7. Accordingly, the stereo sum signal M and output signal $(S+S')$ from the level controlled VCA 4 are matrixed, and left and right stereo signals L and R are generated at left and right output terminals 11 and 12. Furthermore, when the ID signal is not present, the switch 10 is switched to a position opposite to that shown in FIG. 7, and stereo sum signal M and stereo difference signal S are matrixed in the matrix circuit 9. As described above, because FMX stereophonic broadcast system uses compressed and expanded stereo difference signal S, it is possible to achieve significant improvements in the S/N ratio, and the service area can be expanded generally equal to that of the conventional monaural FM broadcast system.

It is to be noted that the FMX stereophonic broadcast transmission signal can be accurately received by a conventional FM stereophonic receiver. In this case, the compressed stereo difference signal S' is quadrature modulated with respect to stereo difference signal S, and reception is not adversely affected.

Details concerning FMX stereophonic broadcasting are disclosed, for example, in an article "Improving the Signal-to-Noise Ratio and Coverage of FM Stereophonic Broadcasts" by Emil L. Torick and Thomas B.

Keller in "JOURNAL OF THE RADIO ENGINEERING SOCIETY", volume 33, number 12, issued December 1985.

Incidentally, in the reception of the FMX stereophonic broadcasting, the noise level is raised by approximately 20 dB at the maximum in the degree of modulation above the knee point (point A) as shown by a solid line (a) in FIG. 6, and there has been a problem that such rising of the noise level tends to be offensive to the ear, thus spoiling pleasant feeling in listening during reception of a signal having a level low on the average but increasing temporarily, e.g. playing sound of a piano or the like.

Meanwhile, it is known that the noise level of a receiving signal increases as the field strength of said receiving signal becomes weak. Therefore, influence of the noise level becomes remarkably larger as the field strength becomes weaker, with respect to the variation of the noise level corresponding to the degree of modulation referred to earlier.

SUMMARY OF THE INVENTION

Accordingly, an essential object of the present invention is to provide an improved FMX stereophonic broadcast receiver which is provided with countermeasures against transient noises, with substantial elimination of disadvantages inherent in the receivers of this kind.

Another object of the present invention is to provide an FMX stereophonic broadcast receiver of the above described type which is simple in construction and reliable in functioning.

In accomplishing these and other objects, according to one preferred embodiment of the present invention, there is provided a receiver which is arranged to receive an FMX stereophonic broadcasting signal including a stereo sum signal, a stereo difference signal and a compressed stereo difference signal modulated in a quadrature relation with respect to said stereo difference signal, and comprises a synchronous detection circuit for detecting the stereo difference signal in an FM detection output signal, a quadrature detection circuit for detecting the compressed stereo difference signal in said FM detection output signal, an expansion circuit for obtaining an expanded signal through employment of output signals of said synchronous detection circuit and said quadrature detection circuit, a level detection circuit for detecting level of the output signal of said synchronous detection circuit, and a level control circuit for controlling level of the output signal of said expansion circuit according to the output signal of said level detection circuit. The FMX stereophonic broadcasting signal receiver is adapted to effect control of stereophonic separation degree by controlling the level of the output signal of said expansion circuit according to the degree of modulation of the FMX stereophonic broadcasting signal.

By the above arrangement of the present invention, since it is so arranged to cause the level control circuit to function when the degree of modulation becomes large so as to control the level of the stereo difference signal to be low, a level difference is produced between the stereo sum signal and the stereo difference signal for deterioration of the stereo separation degree upon matrixing at the matrix circuit, and thus, the noises may be reduced according thereto.

In another aspect of the present invention, there is provided a receiver which is arranged to receive an FMX stereophonic broadcasting signal including a stereo sum signal, a stereo difference signal and a compressed stereo difference signal modulated in a quadrature relation with respect to said stereo difference signal, and comprises a first signal generation circuit for generating an output signal corresponding to field strength of the receiving signal, a first demodulation circuit for demodulating the stereo difference signal in the FM detection output signal, a second demodulation circuit for demodulating the compressed stereo difference signal in the FM detection output signal, an expansion circuit for obtaining an expanded signal through employment of the output signals of said first and second demodulation circuits, a second signal generation circuit for generating an output signal corresponding to level of the output signal of said first demodulation circuit, a level control circuit for controlling level of the stereo difference signal according to the output signals of said first and second signal generation circuits, and a stereo demodulation circuit for generating left and right stereophonic signals through employment of a stereo sum signal in the FM detection output signal and the stereo difference signal subjected to the level control by said level control circuit.

In the above arrangement of the present invention, since the level of the stereo difference signal is controlled according to the field strength of the receiving signal and the degree of modulation of the demodulated stereo difference signal, it is possible to reduce the noise to a large extent by lowering the level of the stereo difference signal when the degree of modulation is large and the field strength is weak. Meanwhile, during strong field strength, the noise is small and thus, deterioration in the degree of stereophonic separation may be prevented without effecting level control of the stereo difference signal even when the degree of modulation becomes large.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
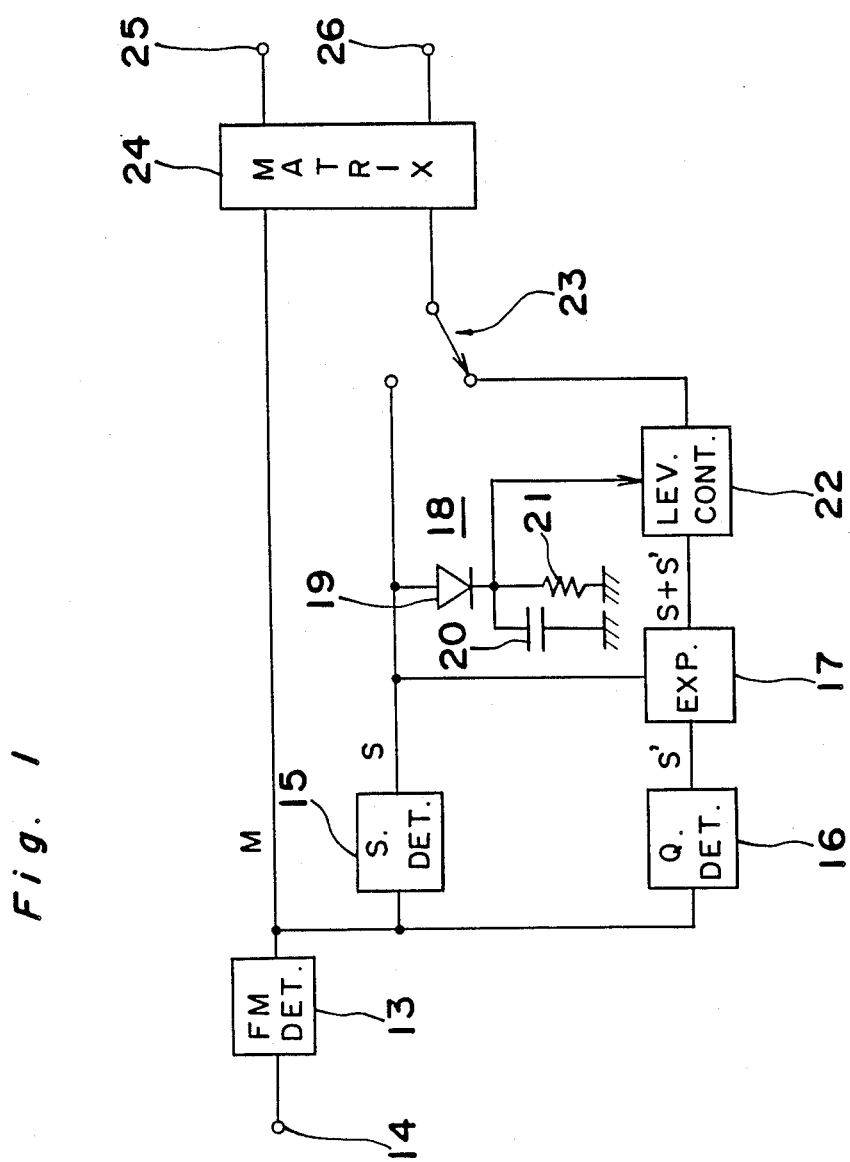
FIG. 1 is an electrical circuit diagram showing construction of an FMX stereophonic broadcast receiver according to one preferred embodiment of the present invention.

Before the description of the present invention proceeds, it is to be noted that like parts are designated by like reference numerals throughout the accompanying drawings.

Referring now to the drawings, there is shown in FIG. 1 an FMX stereophonic broadcast receiver according to one preferred embodiment of the present invention.

The FMX stereophonic broadcast receiver of FIG. 1 generally includes an FM detection circuit 13 for subjecting an FMIF signal applied to an input terminal 14 to FM detection, a synchronous detection circuit 15 for subjecting a stereo difference signal S contained in an output signal of said FM detection circuit 13 to synchronous detection, a quadrature detection circuit 16 for subjecting a compressed stereo difference signal S' in said output signal to quadrature detection, an expansion circuit 17 for effecting expansion of a sum signal (S+S') in which the output signal S of the synchronous detection circuit 15 and the output signal S' of the quadrature detection circuit 16 are added to each other, a level detection circuit 18 including a diode 19, a capacitor 20 and a resistor 21 for detecting the level of the stereo difference signal S, a level control circuit 22 for controlling the level of the output signal (S+S') of said expansion circuit 17 according to the output signal of said level detection circuit 18, a switch 23 for selecting either one of the output signal S of the synchronous detection circuit 15 or the output signal (S+S') of the level control circuit 22 according to ID signals, and a matrix circuit 24 for matrixing a stereo sum signal (L+R) contained in the output signal of the FM detection circuit 13 and the stereo difference signal obtained at the output side of the switch 23 so as to provide left and right stereo signals at left and right output terminals 25 and 26, all of which are connected to each other as shown.

Figure 7:
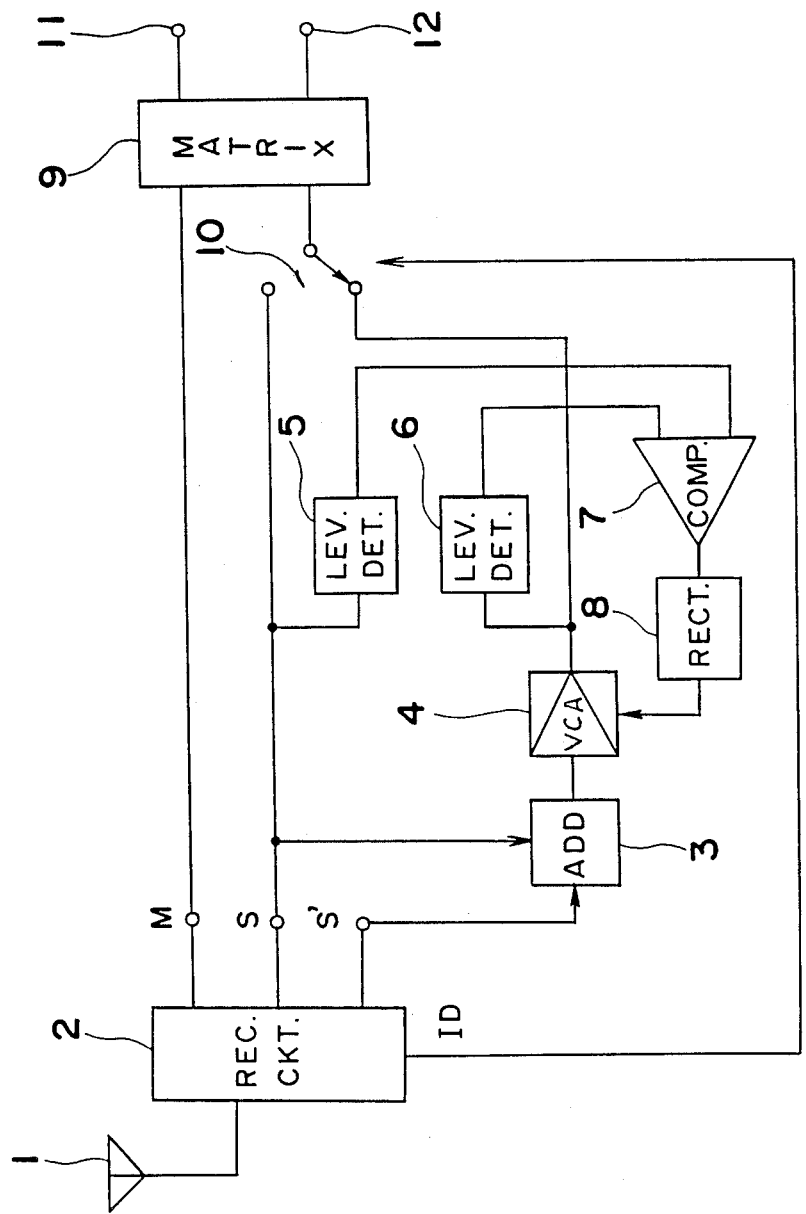
FIG. 7 is an electrical circuit diagram showing construction of a conventional FMX stereophonic broadcast receiver (already referred to).

It is to be noted here that the expansion circuit 17 described above represents in a simplified form the adder 3, voltage control amplifier 4, level detection circuits 5 and 6, comparison circuit 7, and rectifying circuit 8 referred to earlier in the conventional circuit of FIG. 7.

When the degree of modulation of the receiving signal becomes large, the level of the output signal S of the synchronous detection circuit 15 also becomes high, and the level of said output signal S is detected by the level detection circuit 18. Thus, since DC voltage obtained at one end of the capacitor 20 of said level detection circuit 18 is applied to the level control circuit 22 as a control signal, the level of the expanded stereo difference signal (S+S') to be obtained by the expansion circuit 17 is suppressed when the degree of modulation is large. The stereo difference signal (S+S') subjected to the level control is applied to the matrix circuit 24 through the switch 23 so as to be matrixed with the stereo sum signal M. In the case where the degree of modulation of the receiving signal is large, the level of the stereo sum signal M becomes larger than that of the stereo difference signal (S+S'), with consequent lowering of the degree of stereophonic separation, thus making it possible to reduce the noise by that extent. Accordingly, if the circuit of FIG. 1 is employed, undesirable rising of the noise level may be advantageously prevented even when the degree of modulation becomes large during reception of the FMX stereophonic broadcasting.

Figure 2:
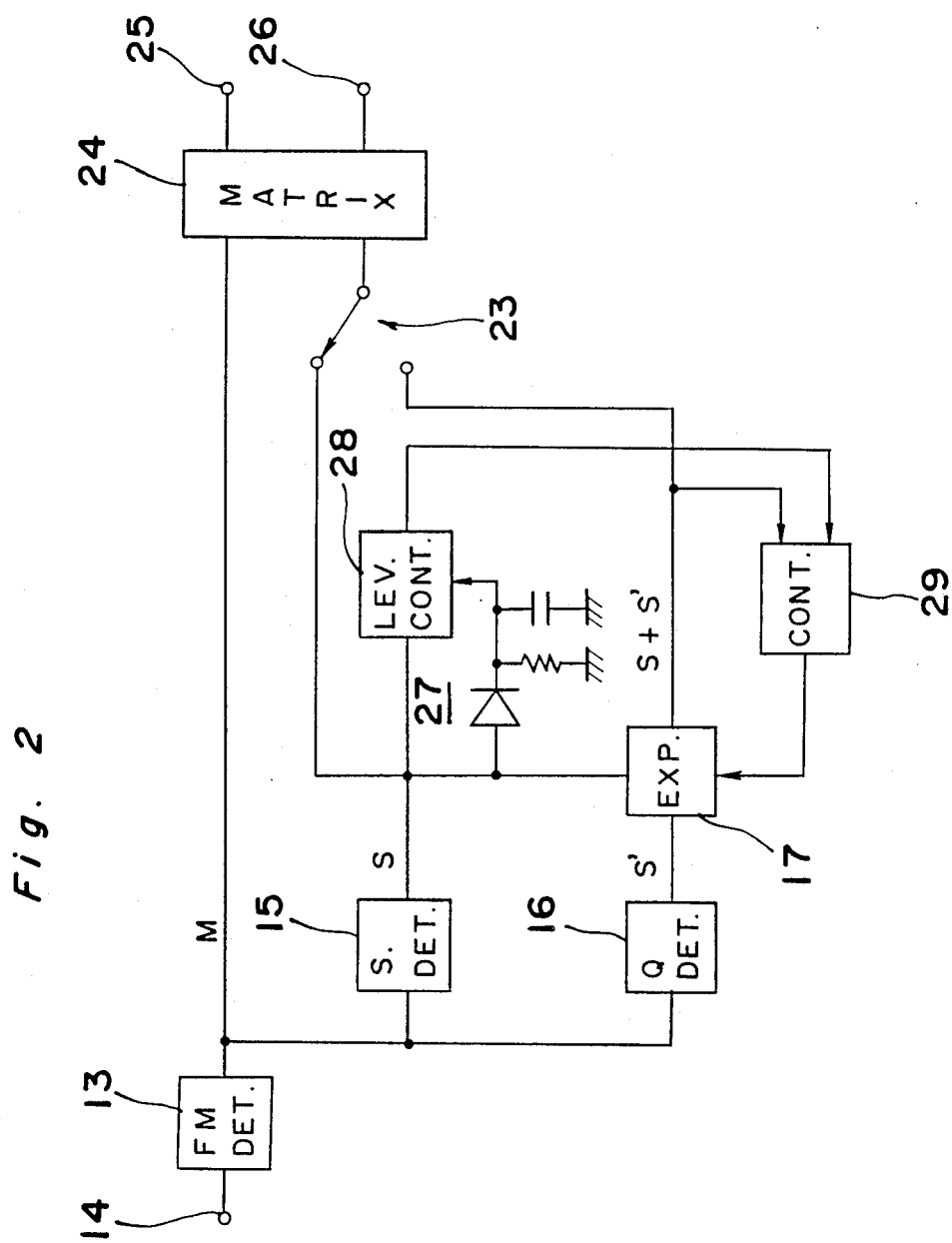
FIG. 2 is an electrical circuit diagram similar to FIG. 1, which particularly shows a second embodiment of the present invention.

Reference is made to FIG. 2 showing an FMX stereophonic broadcast receiver according to a second embodiment of the present invention.

In the construction of FIG. 2, the level detection circuit 18 including the diode 19, capacitor 20 and resistor 21, and the level control circuit 22 in the circuit of FIG. 1 are replaced by a level detection circuit 27 for detecting the level of the output signal S of the synchronous detection circuit 15 and a level control circuit 28 for controlling the level of said output signal S and the output signal of the level control circuit 28 is applied to a control circuit 29 inserted between said level control circuit 28 and the expansion circuit 17 as shown so as to control the expanding function at the expansion circuit 17, while other circuit constructions are generally similar to those in the first embodiment of FIG. 1.

In the case where the level of the output signal S of the synchronous detection circuit 15 is low, the level control at the level control circuit 28 is not effected, and the output signal S is applied to the control circuit 29 as it is for comparison with the level of the sum signal (S+S'). Therefore, normal expansion is effected at the expansion circuit 17, and the level of the sum signal (S+S') becomes equal to the level of the stereo sum signal M, so that the degree of stereophonic separation at the matrix circuit 24 is not deteriorated. When the output signal of the synchronous detection circuit 15 becomes large according to the signal having the degree of modulation above the knee point, the level control circuit 27 is actuated, and the level of the stereo difference signal S is lowered. Accordingly, the level of the output signal (S+S') of the expansion circuit 17 is also lowered to correspond to the level of the stereo difference signal S so as to be lower than the level of the stereo sum signal M. Therefore, degree of stereophonic separation of the matrix circuit 24 is deteriorated to reduce noises for the improvement.

Figure 3:
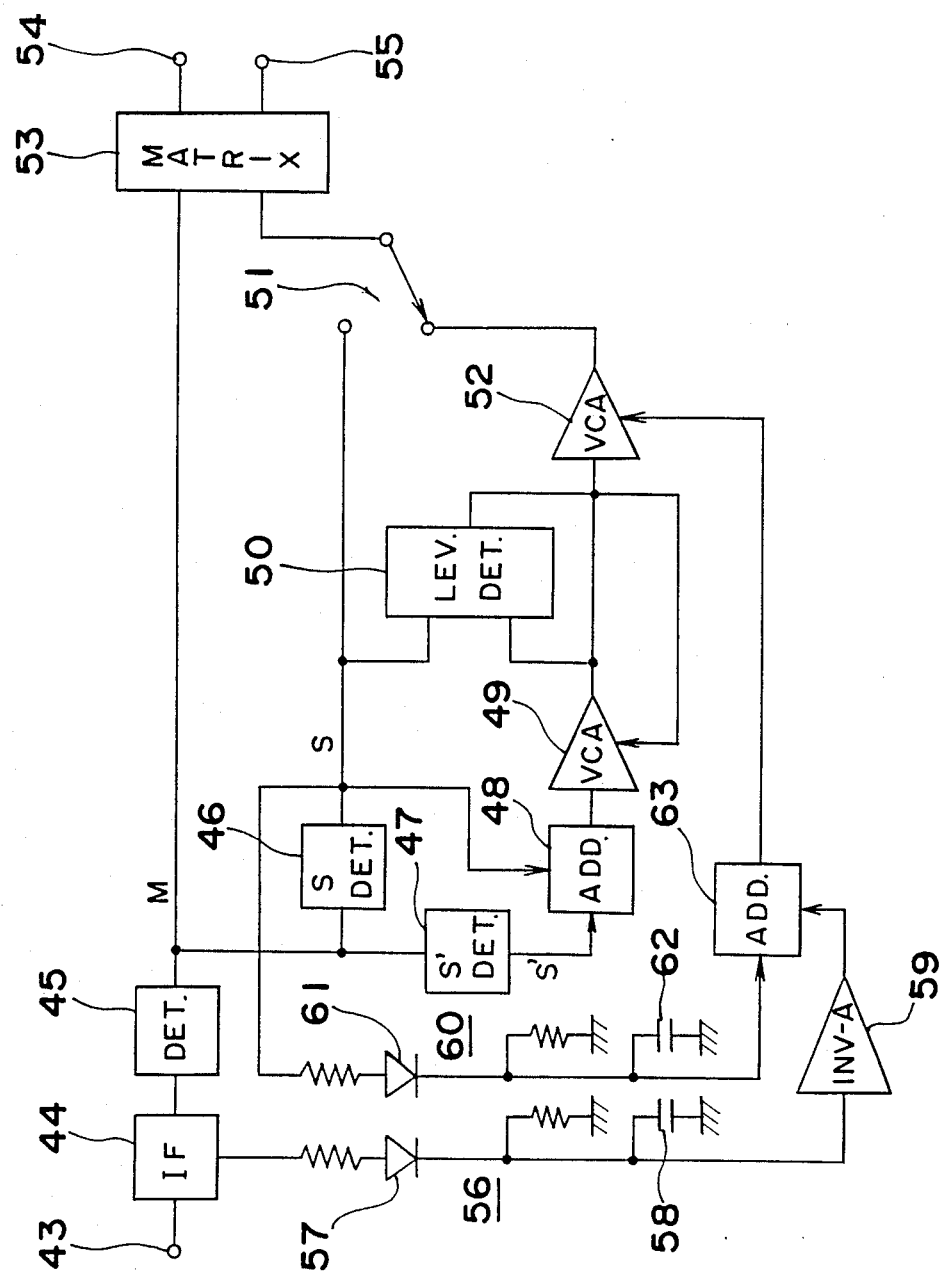
FIG. 3 is also an electrical circuit diagram similar to FIG. 1, which particularly shows a third embodiment of the present invention.
Figure 4:
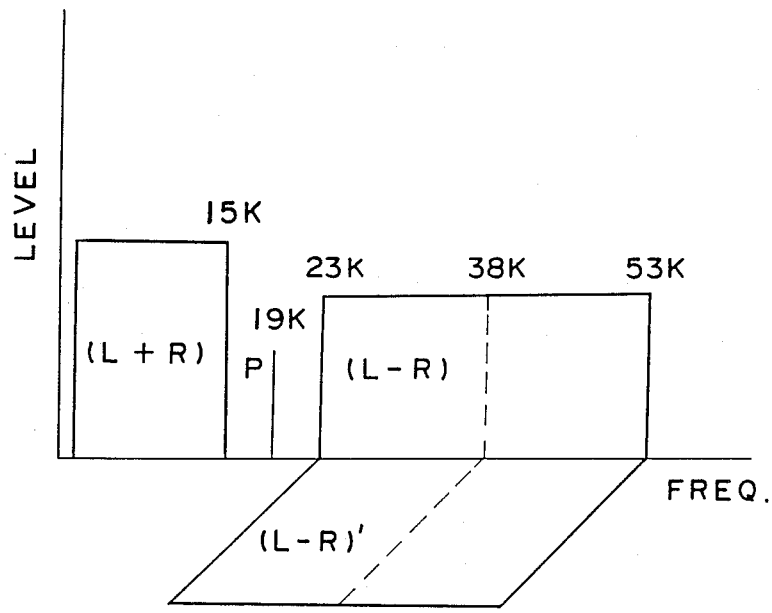
FIG. 4 is a characteristic diagram showing spectrum of FMX stereophonic broadcasting signal (already referred to)
Figure 5:
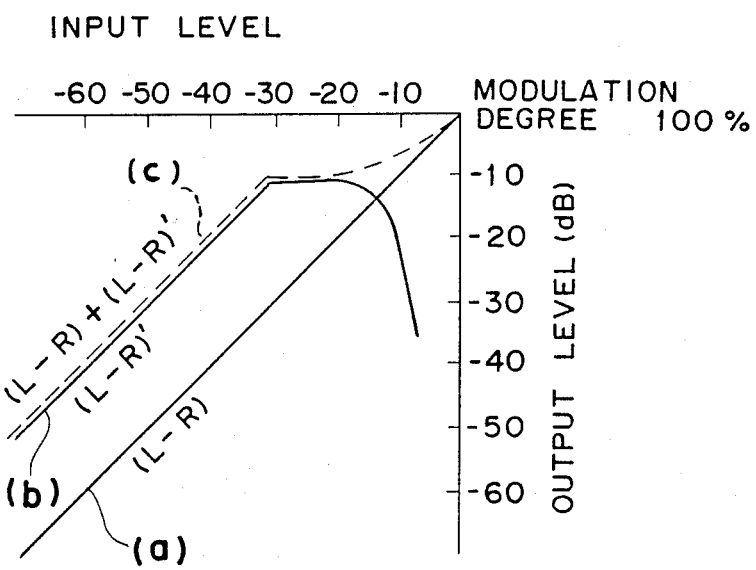
FIG. 5 is a characteristic diagram showing relation between the stereo difference signal and compressed stereo difference signal (already referred to)
Figure 6:
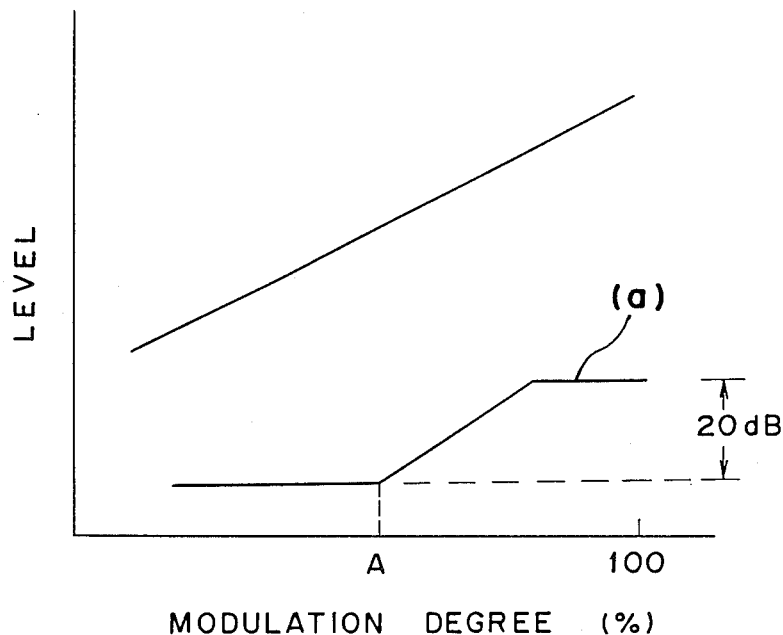
FIG. 6 is a characteristic diagram for explaining the relation between the noise level and degree of modulation (already referred to)

Referring further to FIG. 3, there is shown an FMX stereophonic broadcast receiver according to a third embodiment of the present invention, which generally includes an input terminal 43 to which an IF (intermediate frequency) signal is applied, an IF amplification circuit 44 for amplifying the IF signal, an FM detection circuit 45 for subjecting the amplified IF signal to FM detection, a first demodulation circuit 46 for demodulating the stereo difference signal S in the FM detection output signal, a second demodulation circuit 47 for demodulating the compressed stereo difference signal S' in the FM detection output signal, an addition circuit or adder 48 for adding the output signals of said first and second demodulation circuits 46 and 47, a voltage control amplifier (VCA) 49 for expanding the output signal of said addition circuit 48, a level detection circuit 50 for generating control signal to control gains of the voltage control amplifier 49 by comparing the output signal level of the first demodulation circuit 46 with the output signal level of said voltage control amplifier 49, a change-over circuit 51 for changing over between the output signal of said first demodulation circuit 46 and the output signal of said voltage control amplifier 49 for output, a level control circuit 52 for further subjecting the output signal of said voltage control amplifier 49 to level control, a matrix or stereo modulation circuit 53 which matrixes the stereo sum signal M obtained by the FM detection circuit 45 and the output signal of said change-over circuit 51 for producing left and right stereo signal at left and right output terminals 54 and 55, a first signal generation circuit 56 including a detection diode 57, a smoothing capacitor 58 and an inverting amplifier 59 for producing an output signal corresponding to the level of the IF signal, a second signal generation circuit 60 including a detection diode 61 and a smoothing capacitor 62 for producing an output signal corresponding to the level of the stereo difference signal S obtained at the output end of said first demodulation circuit 46, and an addition circuit or adder 63 for adding the output signals of said first and second signal generation circuits 56 and 60, all of which are coupled to each other as illustrated, with the output signal of said addition circuit 63 being arranged to be applied to the level control circuit 52 as a control signal.

Subsequently, functioning of the FMX stereophonic broadcast receiver in FIG. 3 as described above will be explained hereinafter.

The signal received by an antenna (not shown) is converted into the IF signal, and after having been amplified by the IF amplification circuit 44, is subjected to FM detection by the FM detection circuit 45. The stereo sum signal M in the FM detection output signal is applied to the stereo demodulation circuit 53. In the case where the receiving signal is based on the FM stereophonic broadcasting, the change-over circuit 51 is brought into the state opposite to that shown in FIG. 3, and the stereo difference signal S demodulated by the first demodulation circuit 46 is applied to the stereo demodulation circuit 53 through the change-over circuit 51. Therefore, in the stereo demodulation circuit 53, the stereo sum signal M and the stereo difference signal S are matrixed to provide the left and right stereophonic signals L and R on the left and right output terminals 54 and 55.

Meanwhile, in the case where the receiving signal is based on the FMX stereophonic broadcasting, the change-over circuit 51 takes the position as shown in FIG. 3, and the stereo difference signal S demodulated at the first demodulation circuit 46 and the compressed stereo difference signal S' demodulated at the second demodulation circuit 47 are added to each other by the addition circuit 48. The sum signal (S+S') thus obtained is subjected to level control at the voltage control amplifier 49, and is applied to the stereo demodulation circuit 53 through the change-over circuit 51 and the level control circuit 52. Therefore, in the stereophonic demodulation circuit 53, the stereo sum signal and the expanded stereo difference signal (S+S') are matrixed to provide the left and right stereophonic signals L and R at the left and right output terminals 54 and 55. It is to be noted here that, since the change-over circuit 51 is automatically changed over by an identification signal of 10Hz contained in the FMX stereophonic broadcasting signal, the circuit of FIG. 3 is capable of receiving the FM stereophonic broadcasting and FMX stereophonic broadcasting through automatic ahange-over.

When the field strength of the receiving signal is lowered during reception of the FMX stereophonic broadcasting, the noise level is raised. In such a state, if the degree of modulation of the stereo difference signal is rapidly changed from a small degree to a large degree, the gain of the voltage control amplifier 49 is rapidly increased to amplify the noise at a high gain, with a result that S/N ratio is quickly deteriorated. Meanwhile, if the receiving signal is of a strong field strength, the noise contained in the receiving signal is small, even when the degree of modulation of the stereo difference signal becomes large, with an increase of the gain for the voltage control amplifier 49, and therefore, the S/N ratio is not rapidly deteriorated. According to the present invention, attention has been directed to the above point, and it is intended to improve the S/N ratio through deterioration of the stereophonic separating degree by controlling the level of the stereo difference signal, with the use of the signal corresponding to the field strength of the receiving signal and the signal corresponding to the degree of modulation of the receiving signal.

Now, if it is assumed that the field strength of the receiving signal is large, the level of the signal to be obtained from the IF amplification circuit 44 becomes high, and consequently, the voltage across the smoothing capacitor 58 becomes large, with a decrease of the output signal level of the inverting amplifier 59. Therefore, the output signal level of the addition circuit 63 becomes low irrespective of the extent of the voltage across the smoothing capacitor 62 indicating the degree of modulation of the stereo difference signal S, and thus, the level control circuit 52 does not effect the level control function. Accordingly, the output signal of the voltage control amplifier 49 passes through the level control circuit 52 as it is so as to be applied to the stereo demodulation circuit 53 for being matrixed thereat. Therefore, deterioration of the degree of stereophonic separation is prevented, with a less degradation of the S/N ratio.

Upon lowering of the field strength of the receiving signal, the level of the signal obtained from the IF amplification circuit 44 becomes low, and therefore, the terminal voltage or the voltage across the smoothing capacitor 58 is lowered, with the level of the output signal of the inverting amplifier 59 being raised. In the above state, if the degree of modulation of the stereo difference signal S becomes large, the voltage across the smoothing capacitor 62, is raised, with rising of the output signal level of the addition circuit 63. Since the output signal of the addition circuit 63 is applied to the level control circuit 52 as a control signal, the gain of said level control circuit 52 is lowered, with a consequent lowering of the level of the stereo difference signal (S+S') applied to the stereo demodulation circuit 53. As a result, the stereo separating degree in the stereo demodulation circuit 53 is deteriorated, and the S/N ratio can be improved by that extent.

Even in the case where the field strength of the receiving signal is lowered, no control signal is produced from the addition circuit 63 if the degree of modulation of the stereo difference signal S is small. When the modulation degree of the stereo difference signal S is small, since there is a level difference of about 20 dB between the stereo difference signal S and the compressed stereo difference signal S' so as to be utilized in the noise suppressing effect for the FMX stereophonic broadcasting system, it is not necessary to attempt to improve the S/N ratio by deteriorating the separating degree. However, when the field strength of the receiving signal is extremely lowered, the output level of the inverting amplifier 59 is excessively raised, and since the output signal of the addition circuit 63 is also strengthened to a large extent, the control by the level control circuit 53 is effected so as to improve the S/N ratio by deteriorating the degree of stereophonic separation.

It is to be noted here that, in the foregoing embodiment, although the level control circuit 52 is controlled by generating the control signal through employment of the addition circuit 63, the arrangement may be so modified, for example, that the inverting amplifier 59 and the level control circuit 52 are connected via a switch, which is adapted to be subjected to on/off control according to the voltage across the smoothing capacitor 62.

As is clear from the foregoing description, according to the present invention, unnatural variation of noises during reception of FMX stereophonic broadcasting may be reduced to a large extent. Therefore, since noises as in piano playing signals or the like low in an average level, but high in a momentary level can be lowered, it is possible to improve feeling in the listening.

Furthermore, according to the present invention, an improved FMX stereophonic broadcast receiver capable of receiving the FMX stereophonic broadcasting under favorable conditions may be provided. Particularly, by the present invention, an FMX stereophonic broadcast receiver in which S/N ratio has been improved can be provided, whereby the FMX stereophonic broadcasting in a weak field strength can be favorably received without being obstructed by noises.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A receiver arranged to receive an FMX stereophonic broadcasting signal including a stereo sum signal, a stereo difference signal and a compressed stereo difference signal modulated in a quadrature relation with respect to said stereo difference signal, said FMX stereophonic broadcasting receiver comprising a synchronous detection means for detecting the stereo difference signal in a FM detection output signal, a quadrature detection means for detecting the compressed stereo difference signal in said FM detection output signal, an expansion means for obtaining an expanded signal through employment of output signals of said synchronous detection means and said quadrature detection means, a level detection means for detecting level of the output signal of said synchronous detection means, and a level control means for controlling level of the output signal of said expansion means according to the output signal of said level detection means, said receiver being adapted to effect control of stereophonic separation degree by controlling the level of the output signal of said expansion means according to the degree of modulation of the FMX stereophonic broadcasting signal.

2. A receiver arranged to receive and FMX stereophonic broadcasting signal including a stereo sum signal, a stereo difference signal and a compressed stereo difference signal modulated in a quadrature relation with respect to said stereo difference signal, said FMX stereophonic broadcasting receiver comprising a first signal generation means for generating an output signal corresponding to field strength of the receiving signal, a first demodulation means for demodulating the stereo difference signal in the FM detection output signal, a second demodulation means for demodulating the compressed stereo difference signal in the FM detection output signal, an expansion means for obtaining an expanded signal through employment of the output signals of said first and second demodulation means, a second signal generation means for generating an output signal corresponding to level of the output signal of said first demodulation means, a level control means for controlling level of the stereo difference signal according to the output signals of said first and second signal generation means, and a stereo demodulation means for generating left and right stereophonic signals through employment of a stereo sum signal in the FM detection output signal and the stereo difference signal subjected to the level control by said level control means.

* * * * *